US010542210B2

(12) United States Patent
Kimura

(10) Patent No.: US 10,542,210 B2
(45) Date of Patent: Jan. 21, 2020

(54) DISPLAY CONTROL APPARATUS, IMAGE PROCESSING APPARATUS, DISPLAY CONTROL METHOD, AND IMAGE PROCESSING METHOD IN WHICH A PANORAMIC IMAGE CORRESPONDS TO A RANGE INDICATED ON A USER INTERFACE

(71) Applicant: CANON KABUSHIKI KAISHA, Tokyo (JP)

(72) Inventor: Takumi Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 15/058,376

(22) Filed: Mar. 2, 2016

(65) Prior Publication Data
US 2016/0277679 A1  Sep. 22, 2016

(30) Foreign Application Priority Data
Mar. 20, 2015  (JP) ................. 2015-058293

(51) Int. Cl.
*H04N 7/00* (2011.01)
*H04N 5/232* (2006.01)
(52) U.S. Cl.
CPC ..... *H04N 5/23238* (2013.01); *H04N 5/23206* (2013.01); *H04N 5/23296* (2013.01)
(58) Field of Classification Search
CPC ...... G03B 35/00; H04N 5/23238; H04N 7/00; H04N 5/2628; H04N 5/23206
USPC ........................ 348/36, 39; 345/626; 725/109
See application file for complete search history.

(56) References Cited

U.S. PATENT DOCUMENTS

| 7,218,352 | B2 | 5/2007 | Hasegawa et al. |
| 7,924,318 | B2 | 4/2011 | Hasegawa et al. |
| 8,274,548 | B2 | 9/2012 | Fujita |
| 8,462,253 | B2 | 6/2013 | Hasegawa et al. |
| 8,957,945 | B2 * | 2/2015 | Miyamoto ............. G03B 35/00 348/36 |
| 9,734,680 | B2 | 8/2017 | Hasegawa et al. |
| 2012/0056977 | A1 | 3/2012 | Ohnishi |
| 2012/0098854 | A1 * | 4/2012 | Ohnishi ................. G03B 21/26 345/626 |

(Continued)

FOREIGN PATENT DOCUMENTS

| JP | H11-008845 A | 1/1999 |
| JP | 2003-324723 A | 11/2003 |

(Continued)

OTHER PUBLICATIONS

Office Action dated Feb. 4, 2019, issued in corresponding Japanese Patent Document No. 2015-058293.

(Continued)

*Primary Examiner* — Gims S Philippe
(74) *Attorney, Agent, or Firm* — Venable LLP

(57) ABSTRACT

A display control apparatus includes circuitry configured to obtain information indicating a period to generate a panoramic image generated by a plurality of captured images, the period being specified by a user, to display a range in accordance with the obtained information on a user interface of a display unit, and to generate the panoramic image corresponding to the range displayed on the user interface.

12 Claims, 11 Drawing Sheets

(56) References Cited

U.S. PATENT DOCUMENTS

| | | | |
|---|---|---|---|
| 2012/0242780 A1* | 9/2012 | Yamashita | G03B 35/02 348/36 |
| 2013/0141524 A1 | 6/2013 | Karunamuni et al. | |
| 2015/0082364 A1* | 3/2015 | Jayaram | H04N 5/2628 725/109 |
| 2015/0365595 A1* | 12/2015 | Goto | H04N 5/23238 348/36 |
| 2017/0309144 A1 | 10/2017 | Hasegawa et al. | |
| 2017/0324898 A9* | 11/2017 | Karunamuni | H04N 7/00 |

FOREIGN PATENT DOCUMENTS

| | | |
|---|---|---|
| JP | 2008-099184 A | 4/2008 |
| JP | 2009-089268 A | 4/2009 |
| JP | 2012-060216 A | 3/2012 |
| JP | 2014-236311 A | 12/2014 |

OTHER PUBLICATIONS

Office Action dated Sep. 30, 2019, issued in corresponding Japanese Patent Application No. 2015-058293.

* cited by examiner

DISPLAY CONTROL APPARATUS, IMAGE PROCESSING APPARATUS, DISPLAY CONTROL METHOD, AND IMAGE PROCESSING METHOD IN WHICH A PANORAMIC IMAGE CORRESPONDS TO A RANGE INDICATED ON A USER INTERFACE

BACKGROUND OF THE INVENTION

Field of the Invention

The present invention relates to a technique of generating a panoramic image using captured images of an image capturing device whose imaging direction can be changed.

Description of the Related Art

A panoramic image is used in a network camera. The panoramic image is an image for allowing a range wider than the angle of view of a camera to be observed by joining a plurality of images captured in a plurality of imaging directions within the movable range of the network camera. The user can grasp the current camera direction and change the camera direction to a desired one by using the panoramic image.

A panoramic image is created by joining a plurality of images obtained by fixing the zoom value of the camera, and repeating an operation of moving the imaging direction by the pan and tilt and an image capturing operation so as to cover the movable range of the camera. Japanese Patent Laid-Open No. 11-008845 discloses a method of creating a panoramic image by mapping, to a virtual spherical surface, a plurality of images captured within the movable range of a camera and joining the images. In addition, Japanese Patent Laid-Open No. 2008-099184 discloses a technique of creating a panoramic image based on designation of a panoramic image generation range by the user.

When creating a panoramic image, an image capturing operation is generally performed at the zoom wide-angle end to decrease the number of images to be captured. On the other hand, a network camera emphasizing a telescopic function has an angle of view narrower than that of a normal camera even at the wide-angle end. If the angle of view of the camera is narrow, the number of images to be captured by a camera to create a panoramic image of the same range is larger than that when the angle of view is wide, thereby prolonging a period necessary to perform an image capturing operation.

When, for example, a monitoring target by a network camera is limited to some imaging directions within a movable range, a panoramic image for allowing the whole movable range to be observed is not necessary. In other words, if a panoramic image is created by capturing the whole movable range, an image of a range which is not generally observed may be captured.

SUMMARY OF THE INVENTION

To solve the above-described problem, embodiments to be described below have as their object to appropriately generate a panoramic image of a partial range within the image capturing capable range of an image capturing device.

To solve the above problem, in an embodiment, information indicating a period, or a number of captured images to generate a panoramic image produced by a plurality of captured images is obtained, information indicating a range in accordance with the obtained information is displayed by a display unit, and the range indicated by the displayed information is included in a capable range in which an image capturing device can perform image capturing to obtain the plurality of captured images for generating the panoramic image.

Further features of the present invention will become apparent from the following description of exemplary embodiments with reference to the attached drawings.

BRIEF DESCRIPTION OF THE DRAWINGS

FIG. 4 is a view showing an example of a GUI generated by a display control unit or the like.

DESCRIPTION OF THE EMBODIMENTS

A display control apparatus, image processing apparatus, display control method, and image processing method in a network camera system according to embodiments of the present invention will be described in detail below with reference to the accompanying drawings. Note that the embodiments are not intended to limit the present invention to the scope of the claims, and not all of the combinations of arrangements set forth in the embodiments are necessarily required with respect to the solution of the problems according to the present invention.

First Embodiment

The first embodiment will describe processing of presenting the image capturing range of a panoramic image which can be created within a creation period (or the number of images) corresponding to information for determining a creation period (or the number of captured images) to be input by the user, and creating a panoramic image of the image capturing range.

[Network Camera System]

Figure 1:
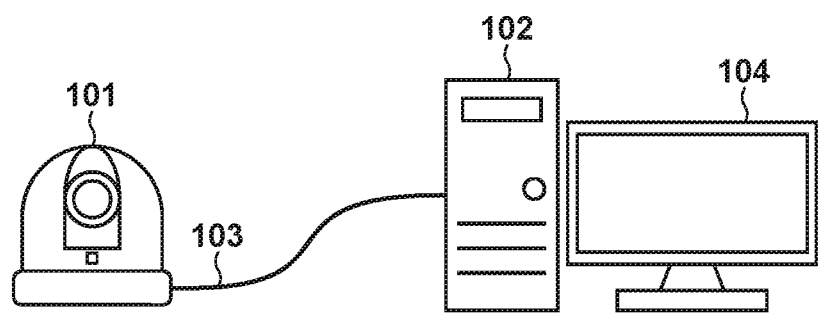
FIG. 1 is a view showing an overview of a network camera system according to an embodiment.

FIG. 1 shows an overview of a network camera system according to the embodiment. The network camera system according to the embodiment shown in FIG. 1 includes a network camera (to be referred to as a "camera" hereinafter) 101 serving as an image capturing device whose imaging direction can be changed, a client device 102 serving as a computer device, and a display device 104 such as a monitor. The camera 101 and the client device 102 are connected by a wired or wireless network 103 capable of performing Internet protocol (IP)-based communication.

The camera 101 distributes a live video or the like through the network 103. The client device 102 transmits an instruction and settings to the camera 101 through the network 103, receives a live video, a captured image, or the like from the camera 101 through the network 103, and displays the received video, image, or the like on the display device 104.

The network 103 is a network such as the Internet or an intranet having a sufficient band to transmit/receive a camera control signal and an image signal having undergone data compression. Assume that TCP/IP (Transmission Control Protocol/Internet Protocol) or UDP/IP (User Datagram Protocol/Internet Protocol) is used as a network protocol. In this case, an IP address is assigned to each of the camera 101 and the client device 102. Therefore, the client device 102 establishes a connection to the camera 101 for receiving distribution of a live video or the like using the IP address assigned to the camera 101.

Note that for the sake of simplicity, FIG. 1 shows the network camera system including one camera 101 and one client device 102. However, the number of cameras 101 and the number of client devices 102 are not limited.

Camera

Figure 2:
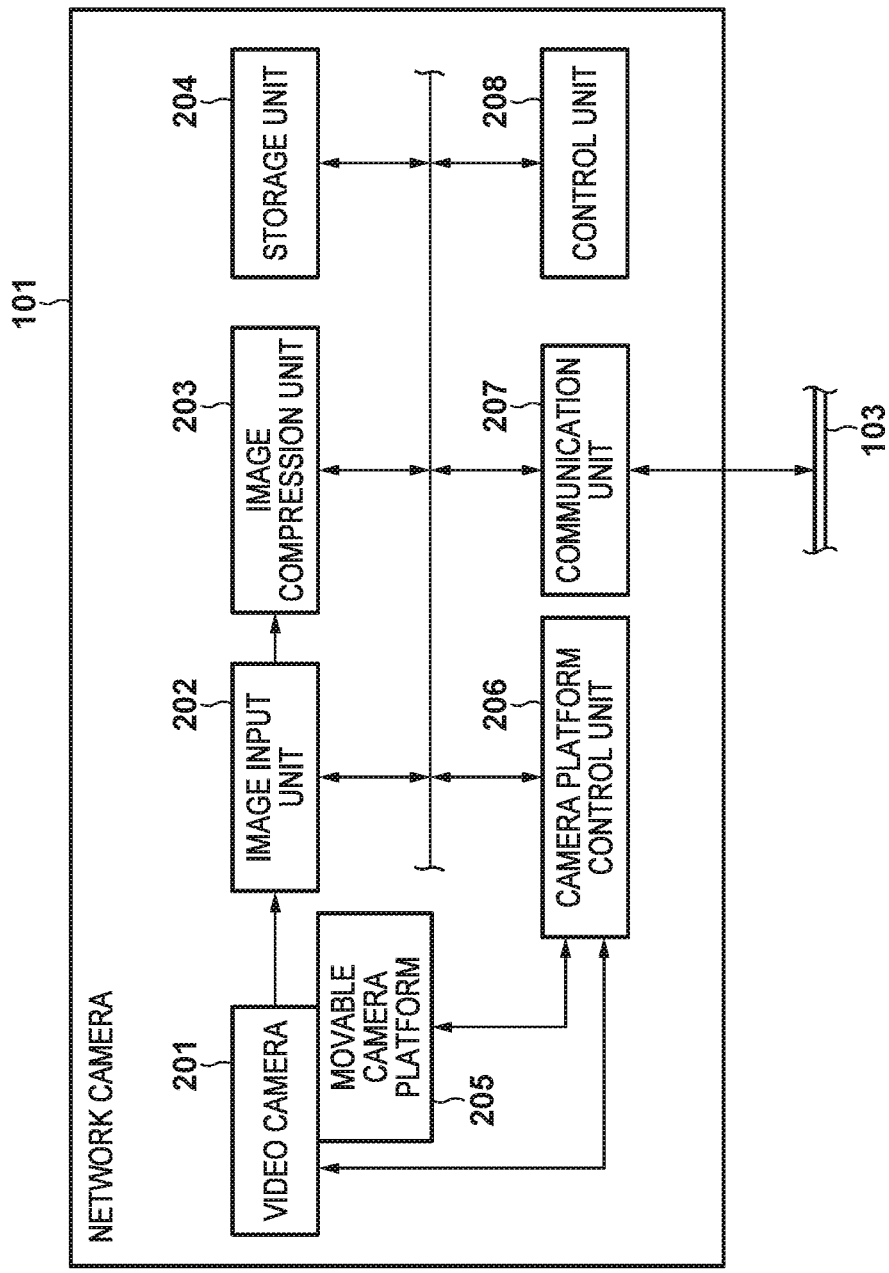
FIG. 2 is a block diagram showing the arrangement of a camera.

FIG. 2 is a block diagram showing the arrangement of the camera 101. The camera 101 transmits a live video or the like to the client device 102 by performing various camera operations based on a command received from the client device 102 through a communication unit 207 connected to the network 103.

A control unit 208 includes a microprocessor, and controls the overall camera 101 by executing control programs and the like stored in the flash memory or the like of a storage unit 204 using the random access memory (RAM) of the storage unit 204 as a work memory. The control unit 208 interprets the command received through the communication unit 207. If the command indicates pan and tilt, the control unit 208 sends control information indicated by the command to a camera platform control unit 206.

The camera platform control unit 206 controls a movable camera platform 205 incorporating a video camera 201 in accordance with the control information, and controls a pan angle and tilt angle. Even if the command indicates a zoom ratio and various image quality settings, control information indicated by the command is sent to the camera platform control unit 206, and the camera platform control unit 206 controls the zoom ratio and various image quality settings of the video camera 201 in accordance with the control information.

An image input unit 202 obtains a video (moving image and still image) captured by the video camera 201. Note that if images of 30 frames are obtained for one sec, it is possible to obtain a moving image of 30 fps (frames/second). An image compression unit 203 compresses the video obtained by the image input unit 202 to a data size which can be readily distributed to the client device 102.

The image compression unit 203 sends, to the communication unit 207, image data obtained by performing analog-to-digital conversion for, for example, an NTSC (National Television System Committee) video signal output from the video camera 201, and then compressing the converted signal to a Motion JPEG (Joint Photographic Experts Group) format. This transmits the image data of the Motion JPEG format to the client device 102. Note that the compression data format of the video signal is not limited to the Motion JPEG format, and an arbitrary format such as H.261, H.263, H.264, or H.265 can be used. It is possible to change the compression data format, data compression ratio, frame rate, image size (resolution), and the like of the image data output from the image compression unit 203 using a command transmitted from the client device 102 to the camera 101, as a matter of course.

Processing executed by the control unit 208 includes processing of generating a panoramic image and storing it in the storage unit 204 and a detailed description thereof will be provided later.

Client Device

Figure 3A:
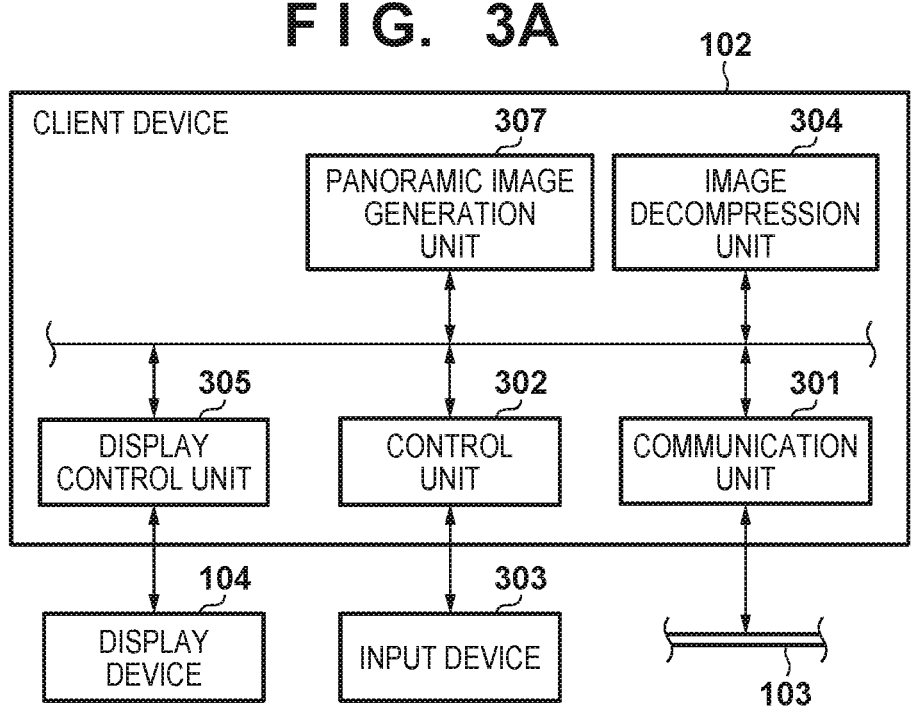
FIGS. 3A and 3B are block diagrams showing the arrangement of a client device.
Figure 3B:
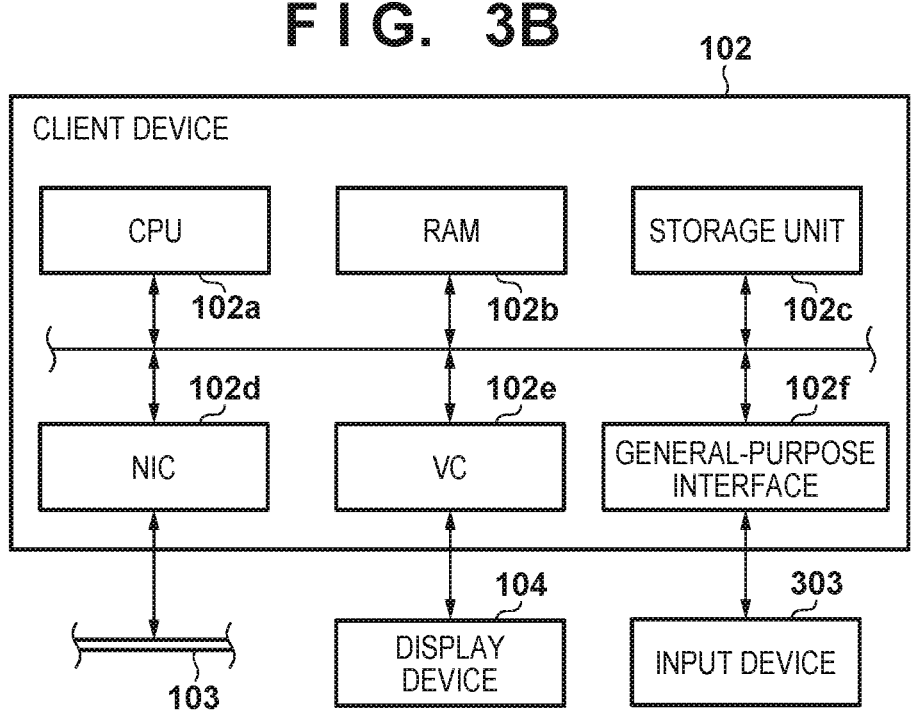

FIGS. 3A and 3B are block diagrams showing the arrangement of the client device 102. The arrangement of the image processing apparatus shown in FIG. 3A is implemented when a microprocessor (CPU) 102a of the client device 102 shown in FIG. 3B executes a program.

Referring to FIG. 3B, the CPU 102a uses a RAM 102b as a work memory to execute a program stored in a storage unit 102c such as a read only memory (ROM), hard disk drive (HDD), or solid-state drive (SSD). In accordance with the program, the CPU 102a communicates with the camera 101 through a network interface card (NIC) 102d, and displays various images on the display device 104 through a video card (VC) 102e. The CPU 102a inputs a user instruction and the like from an input device 303 such as a keyboard and mouse connected through a general-purpose interface such as USB (Universal Serial Bus). Note that a touch panel overlaid on the screen of the display device 104 or the like can be used as the input device 303.

Referring to FIG. 3A, a communication unit 301 transmits a command to the camera 101, and receives information (to be referred to as "operation result information" hereinafter) indicating the results of the various camera operations based on the command while receiving image data and/or panoramic image data transmitted from the camera 101. In other words, the communication unit 301 functions as a command transmission unit and a captured image obtaining unit. An image decompression unit 304 decompresses image data or panoramic image data having undergone data compression, thereby generating image data processible by a display control unit 305.

The display control unit 305 generates image data of the live video or panoramic image output from the image decompression unit 304 and a graphical user interface (GUI) for displaying the results of the various camera operations, and displays them on the display device 104. Note that if the client device 102 is connected to a plurality of cameras 101, the display control unit 305 can display, on the screen of the display device 104, a GUI corresponding to the plurality of cameras 101 or a GUI corresponding to a selected one of the cameras 101.

The user inputs parameters and setting values for determining the operation of the camera 101 by operating the input device 303 based on the GUI. Based on the user operation on the GUI, a control unit 302 generates a command corresponding to the various camera operations, and transmits the generated command to the camera 101 through the communication unit 301. Furthermore, the control unit 302 interprets the operation result information received from the camera 101, and sends the results of the various camera operations to the display control unit 305.

A panoramic image generation unit 307 generates a panoramic image by joining a plurality of images, and sends the generated panoramic image to the display control unit 305, and a detailed description thereof will be provided later. Note that the user can issue an image accumulation instruction and the like by operating the GUI in addition to the various camera operations. Therefore, although processing components for performing screen display and control are not shown in FIGS. 3A and 3B, screen display and control are performed by the CPU 102a, as a matter of course.

GUI

Figure 4:
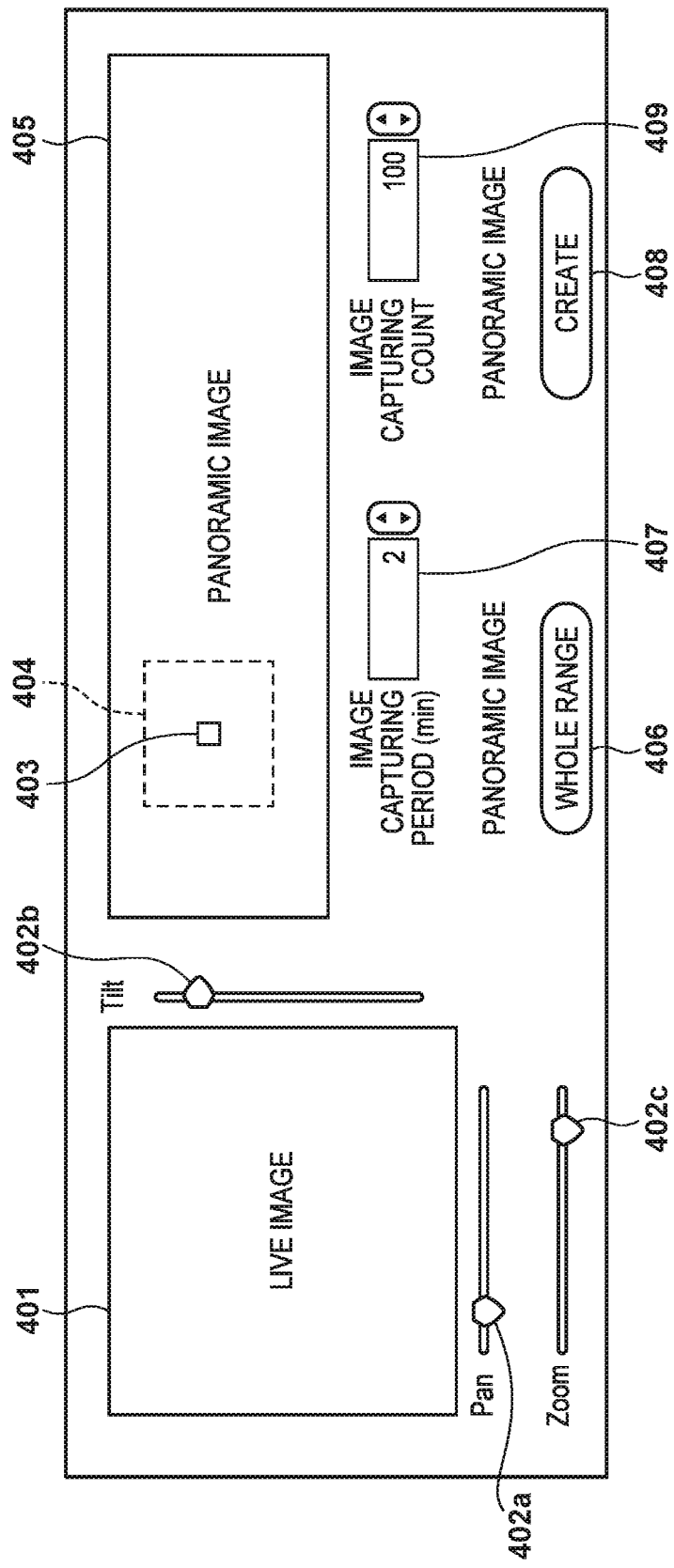

FIG. 4 shows an example of a GUI generated by the display control unit 305 or the like. The live video received from the camera 101 is displayed on a video display portion 401. The user can control the pan, tilt, and zoom of the camera 101 by operating controls such as sliders 402a, 402b, and 402c using the input device 303 while observing the live video displayed on the video display portion 401.

For example, a panoramic image representing the whole range which can be captured by the camera 101 is displayed on a panoramic image display portion 405. The panoramic image displayed on the panoramic image display portion 405 is the panoramic image received from the camera 101 or generated by the panoramic image generation unit 307. Note that if no panoramic image has been created, a black background image or the like is displayed on the panoramic image display portion 405 to indicate it. As described above, if a panoramic image has been created once, the created panoramic image is presented as the image capturing capable range of the image capturing device.

A guide box 403 indicating the current image capturing range is displayed on the panoramic image, and the user can intuitionally grasp a range within the whole image capturing capable range of the camera 101, which currently corresponds to the image capturing range of the live video displayed on the video display portion 401. When the user changes one of the pan, tilt, and zoom of the camera 101 by operating a corresponding one of the sliders 402a, 402b, and 402c, the display position of the guide box 403 moves on the panoramic image or the size of the guide box 403 changes accordingly.

At the time of installation of the camera 101, a panoramic image (to be referred to as a "whole range image" hereinafter) representing the whole image capturing capable range of the camera 101 is obtained, and stored in, for example, the storage unit 204 of the camera 101. When scenery captured by the camera 101 changes, the whole range image stored in the storage unit 204 is updated, as needed.

As will be described later, the panoramic image displayed on the panoramic image display portion 405 can be changed to a panoramic image (to be referred to as a "partial range image" hereinafter) of an image capturing range narrower than the whole range image by a user operation. In other words, the partial range image is a panoramic image of a partial range within the image capturing capable range of the camera 101. Display of the partial range image is effective when, for example, the user wants to observe details by zooming in a narrower range.

The user may want to capture a range wider than the image capturing range of the partial range image after changing the panoramic image from the whole range image to the partial range image. In this case, the user can reset the panoramic image displayed on the panoramic image display portion 405 to the whole range image by pressing a "whole range" button 406.

Generation of Panoramic Image (Client Device)

Figure 5A:
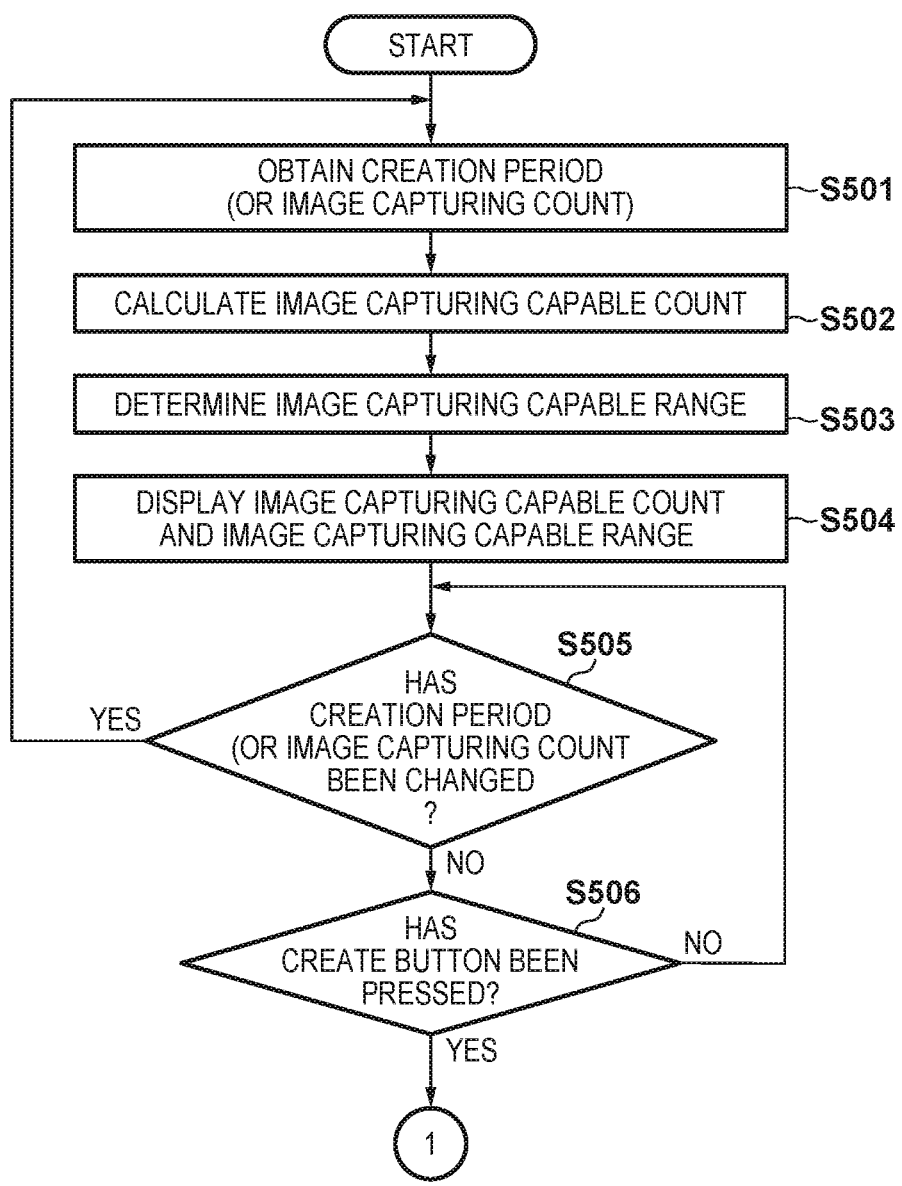
FIGS. 5A and 5B are flowcharts for explaining panoramic image generation processing.
Figure 5B:
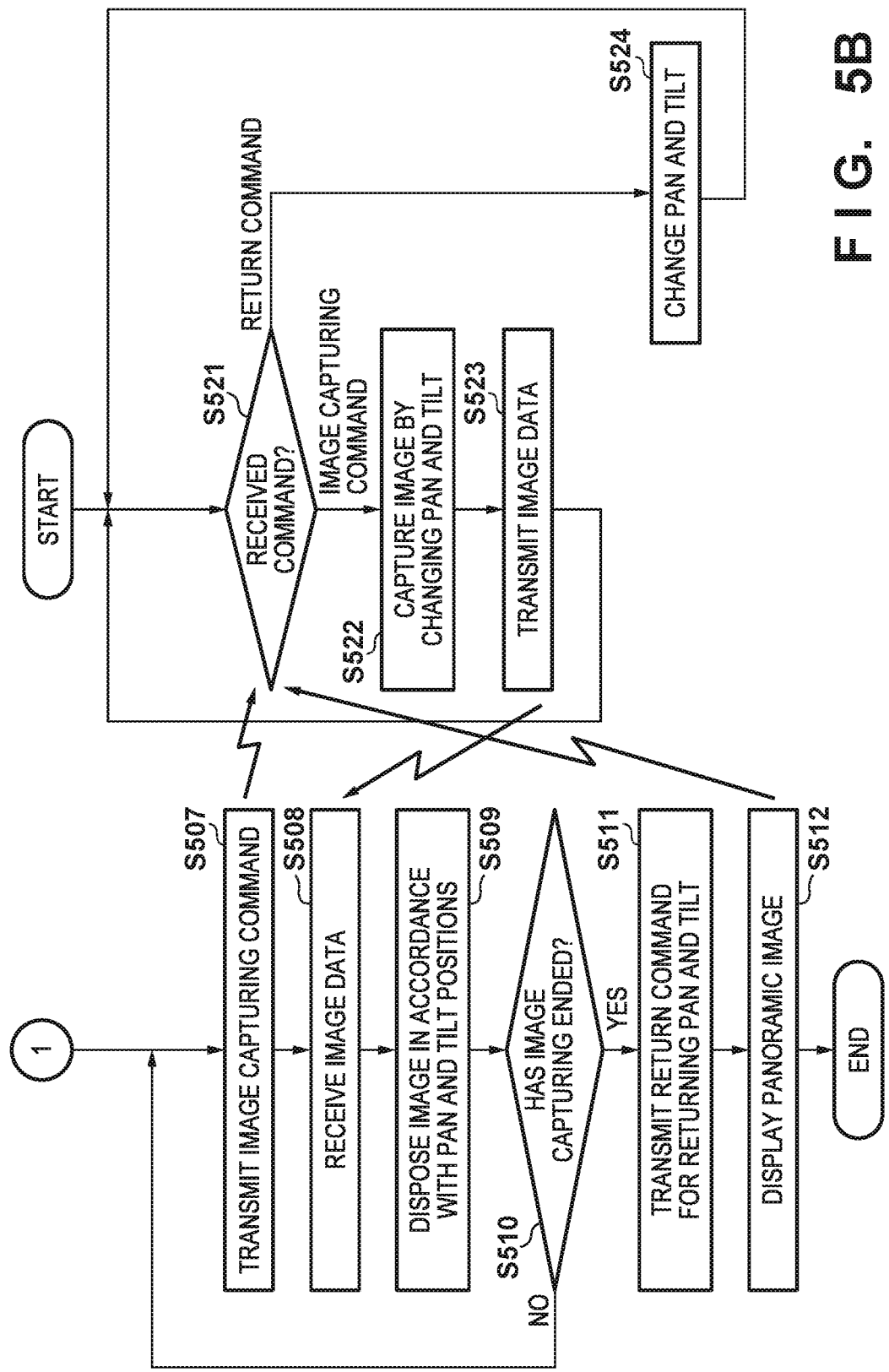

FIGS. 5A and 5B are flowcharts for explaining panoramic image generation processing. When creating a panoramic image, the user inputs a panoramic image creation period in a text box 407 on the GUI. When the creation period is input, the control unit 302 obtains the creation period (S501), and calculates an image capturing capable count by dividing the creation period by the period of one image capturing operation (S502). Note that the period of one image capturing operation is given by the sum of a period for obtaining an image in one imaging direction and a period necessary to perform pan and tilt operations for one angle of view, and can be determined in advance at a predetermined accuracy based on the performance and specification of the camera 101.

The angle of view used to calculate the image capturing capable count is, for example, an angle of view when setting the zoom to the wide-angle end. If the user wants to create a high-resolution panoramic image, an angle of view when zooming in at a predetermined zoom ratio may be used. In either case, it is possible to reduce the calculation load by performing calculation using a given angle of view at a given zoom ratio.

The control unit 302 determines an image capturing capable range based on the image capturing capable count (S503). If the size ratio between a pan direction and a tilt direction and a central position are determined, it is possible to determine an image capturing capable range. For example, the size ratio is set as the aspect ratio of a captured image and the central position is set as the current image capturing range (guide box 403). The control unit 302 controls the display control unit 305 to display the image capturing capable count in a text box 409 and display a range box 404 indicating the image capturing capable range on the panoramic image display portion 405 (S504).

As described above, when information indicating the period for creating a panoramic image created by a plurality of captured images is obtained, information (for example, the range box 404) indicating a range corresponding to the obtained period within the range which can be captured by the image capturing device is displayed. The present invention is not limited to the display of the range box 404, and information capable of identifying the range may be displayed, for example, the color of the range corresponding to the obtained period may be changed.

When information indicating an image capturing count (the number of captured images) for creating a panoramic image created by a plurality of captured images is obtained, information (for example, the range box 404) indicating a range corresponding to the obtained image capturing count within the range which can be captured by the image capturing device is displayed. The present invention is not limited to the display of the range box 404, and information capable of identifying the range may be displayed, for example, the color of the range corresponding to the obtained period may be changed.

When the creation period is input, the control unit 302 may control the display control unit 305 to display, on the panoramic image display portion 405, the image capturing capable count calculated based on the input creation period.

The display of the range box 404 allows the user to recognize a range, a panoramic image of which can be created within the designated creation period. When the user wants a panoramic image of the range indicated by the range box 404, he/she presses a "create" button 408 to instruct creation of a panoramic image. If the user considers that the range indicated by the range box 404 is too wide or narrow, he/she corrects the creation period in the text box 407.

The example in which the user designates the creation period has been described above. However, the user may designate the image capturing count (the number of captured images) in the text box 409. If the image capturing count is designated, the control unit 302 calculates a creation period by multiplying the image capturing count by the period of one image capturing operation, and determines an image capturing capable range based on the image capturing count. Note that when the image capturing count is input, the control unit 302 may control the display control unit 305 to display, on the panoramic image display portion 405, the creation period calculated based on the input image capturing count.

After displaying the range box 404, the control unit 302 determines whether the creation period (or image capturing count) has been changed (S505), and determines whether the "create" button 408 has been pressed (S506). If the user has changed the creation period (or image capturing count) without pressing the "create" button 408, the process returns to step S501 to determine an image capturing capable range again.

When the "create" button 408 is pressed, the control unit 302 generates an image capturing command using, as setting information for generating a panoramic image, the range corresponding to the range box 404, and transmits the image capturing command to the camera 101 (S507).

Upon receiving the image capturing command (S521), the camera 101 captures an image by changing the pan and tilt of the video camera 201 in accordance with the image capturing command (S522). Note that the order of the pan and tilt is arbitrary. For example, there may be provided a method of starting from the guide box 403 and performing, up to the upper right portion of the range box 404, an operation of panning rightward by one angle of view, tilting downward by one angle of view, panning leftward by one angle of view twice, tilting upward by one angle of view twice, panning rightward by one angle of view three times, and so on. In this way, the imaging direction is changed to rotate. The change of the imaging direction in this way will be referred to as movement of the imaging direction in a loop, spiral, helical, or whirl pattern hereafter. A method of changing the imaging direction is not limited to this, and the imaging direction may be changed so that a captured range spreads.

The camera 101 performs data compression for a captured image and transmits the compressed data to the client device 102 (S523). In the client device 102, the communication unit 301 receives the image data, and the image decompression unit 304 decompresses the received image data and inputs it to the panoramic image generation unit 307 (S508). The panoramic image generation unit 307 disposes the input image in accordance with pan and tilt positions input from the control unit 302 (S509).

The control unit 302 determines whether image capturing of the range corresponding to the setting information (range corresponding to the range box 404) has ended (S510). If image capturing has not ended, the process returns to step S507 to generate a command corresponding to the next imaging direction and transmit it to the camera 101.

When image capturing of the range corresponding to the setting information ends, the control unit 302 transmits, to the camera 101, a return command for returning the pan and tilt to the position of the guide box 403 (S511). Upon receiving the return command (S521), the camera 101 changes the pan and tilt of the video camera 201 to those indicated by the return command (S524). The control unit 302 controls the display control unit 305 to display the panoramic image generated by the panoramic image generation unit 307 on the panoramic image display portion 405 (S512).

Creation of Panoramic Image (Camera)

Figure 6:
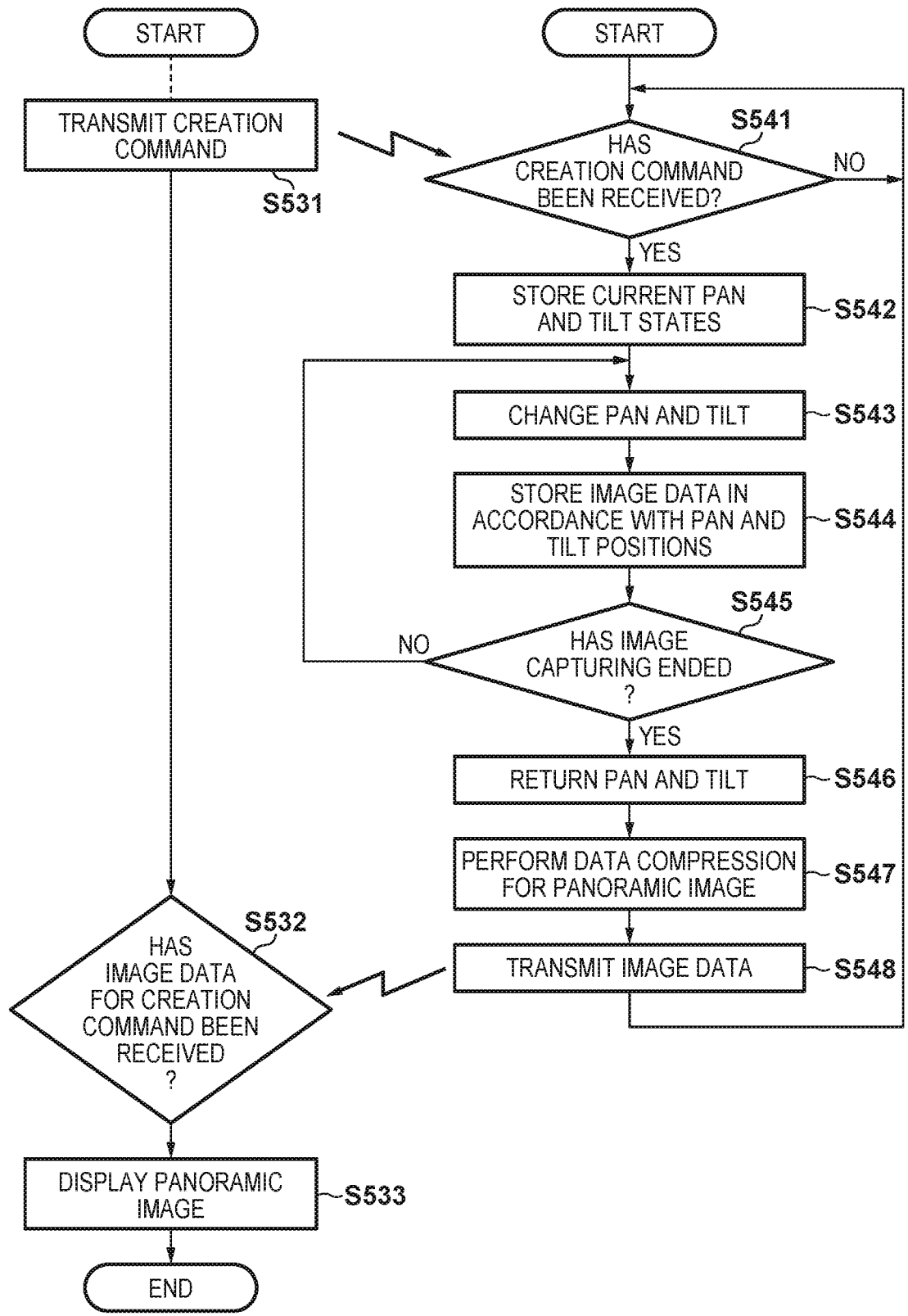
FIG. 6 is a flowchart for explaining processing when a camera generates a panoramic image.

Although FIGS. 5A and 5B show the processing of generating a panoramic image in the client device 102, the camera 101 can create a panoramic image. FIG. 6 is a flowchart for explaining processing when the camera 101 generates a panoramic image. Note that the same processes as those (S501 to S506) in FIGS. 5A and 5B are not shown in FIG. 6.

When the "create" button 408 is pressed, the control unit 302 of the client device 102 generates a creation command for creating a panoramic image using, as setting information for generating a panoramic image, the range corresponding to the range box 404. The control unit 302 transmits the creation command to the camera 101 (S531). The creation command contains, as setting information, data indicating the above-described movement of the imaging direction in a spiral pattern or image capturing range information. The image capturing range information indicates, for example, a movement count for the angle of view in the vertical direction and a movement count for the angle of view in the horizontal direction by setting the current imaging direction (guide box 403) as the center.

Upon receiving the creation command (S541), the control unit 208 of the camera 101 stores the current pan and tilt states in the storage unit 204 (S542), and then starts to generate a panoramic image based on the creation command. The control unit 208 controls the camera platform control unit 206 to change the pan and tilt of the video camera 201 (S543), and then stores, in the storage unit 204, the image obtained by the image input unit 202 in accordance with the pan and tilt positions (S544).

The control unit 208 determines whether image capturing of the range indicated by the setting information of the creation command has ended (S545). If image capturing has not ended, the process returns to step S543 to obtain an image in an imaging direction corresponding to the next pan and tilt. When image capturing of the range indicated by the setting information of the creation command ends, the control unit 208 controls the camera platform control unit 206 to return the pan and tilt based on the pan and tilt states stored in the storage unit 204 (S546). The control unit 208 reads out the panoramic image, and transmits, to the client device 102, the image data having undergone data compression by the image compression unit 203 (S547).

Upon receiving the image data for the creation command (S532), the control unit 302 controls the image decompression unit 304 to decompress the received image data, and controls the display control unit 305 to display the panoramic image on the panoramic image display portion 405 (S533).

Note that the range box 404 indicating the image capturing capable range is not limited to the rectangle, and may have any shape such as a trapezoidal, polygonal, or circular shape. Furthermore, the generated panoramic image can be saved in the storage unit 102c of the client device 102. When the panoramic images are saved, it is possible to sequentially change the panoramic image displayed on the panoramic image display portion 405 in the order of saving in the storage unit 102c by providing a "return" button and "forward" button on the GUI although not shown in FIG. 4. By providing a "load" button and load dialog, the panoramic image to be displayed on the panoramic image display portion 405 may be selected from the panoramic images saved in the storage unit 102c.

As described above, the user can recognize the image capturing range of the panoramic image (partial range image) corresponding to the creation period or the number of captured images for creating the panoramic image using the GUI of the client device 102. It is possible to instruct creation of a panoramic image in accordance with a status or application purpose. For example, if the period is limited, a panoramic image of a narrow range is created within a short period, and if an enough period is set, a panoramic image of a wider range is created.

The example in which the user inputs the creation period (or the number of images) has been described above. However, a creation period (or the number of images) may be determined based on the result of designation of an image capturing range by the user. In this case, the image capturing range of a panoramic image which can be created within a creation period (or the number of images) corresponding to information for determining a creation period (or the number of images) to be input by the user is presented, and a panoramic image of the image capturing range is created.

Second Embodiment

A display control apparatus, image processing apparatus, display control method, and image processing method in a network camera system according to the second embodiment of the present invention will be described below. Note that in the second embodiment, the same reference numerals as those in the first embodiment denote the same components and a detailed description thereof may be omitted.

Figure 7:
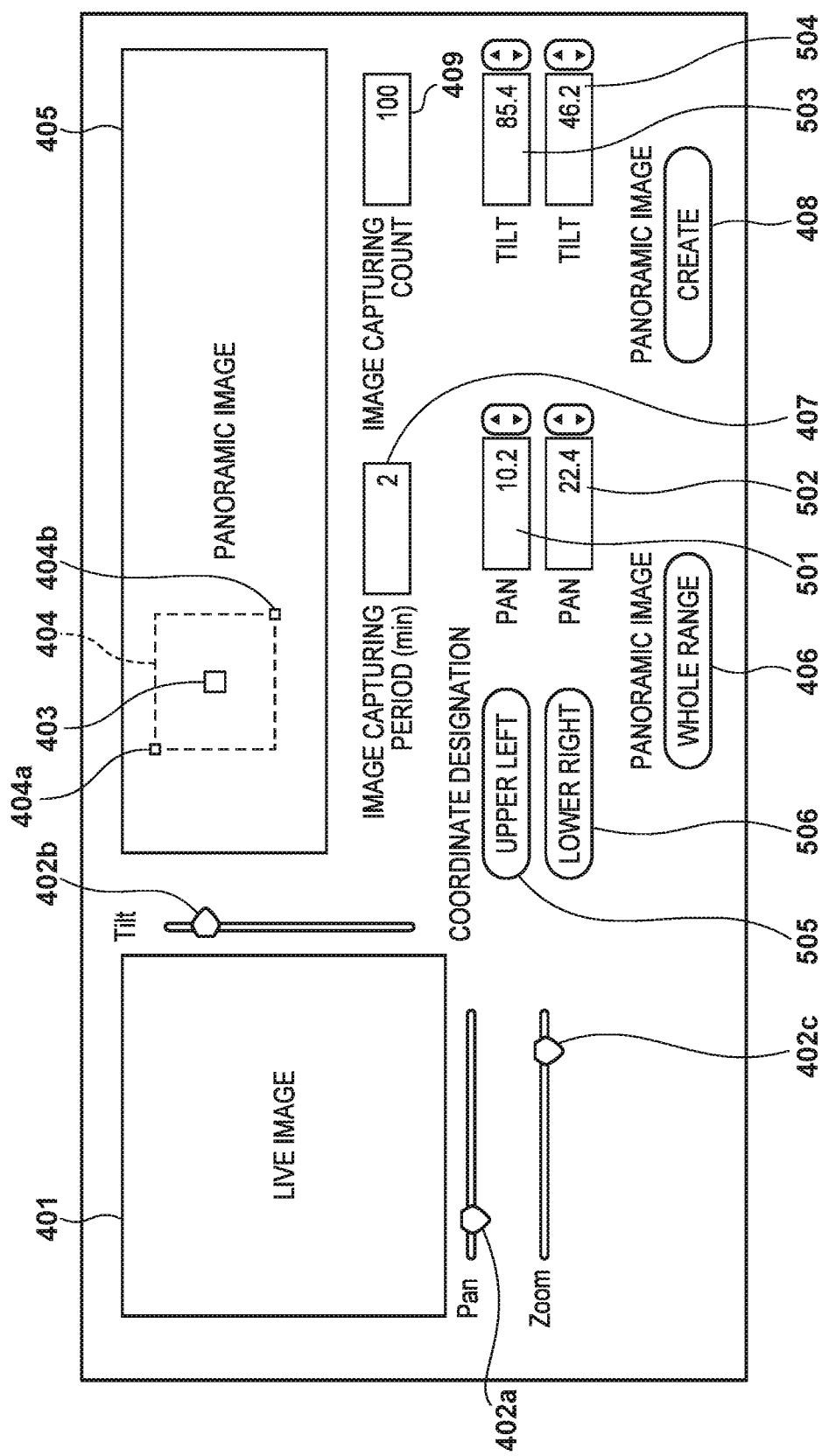
FIG. 7 is a view showing an example of a GUI generated by a display control unit or the like according to the second embodiment.

The second embodiment will describe processing of presenting a period necessary to create a panoramic image of a range designated by the user and the like, and creating a panoramic image of the range. FIG. 7 shows an example of a GUI generated by a display control unit 305 or the like according to the second embodiment. By using the GUI shown in FIG. 7, the user can select a range, a panoramic image of which is to be generated, from the movable range of a camera 101.

A range box 404 of a default size is displayed outside a guide box 403 indicating the current image capturing position. The user can freely enlarge/reduce the range box 404 by moving a handle 404a or 404b displayed at a corner of the range box 404. Along with the enlargement/reduction operation, the upper left coordinates and lower right coordinates of the range box 404 are displayed in text boxes 501 to 504. The user may directly input numerical values to the text boxes 501 to 504, as a matter of course. The range box 404 corresponds to the image capturing range of a panoramic image.

Alternatively, it is possible to set the range box 404 by obtaining the imaging direction of the camera 101. That is, the user operates sliders 402a and 402b and the like to move the imaging direction to the upper left of a range, a panoramic image of which is to be created, while observing a live video on a video display portion 401, and presses a "upper left" button 505. This operation inputs, to the text boxes 501 and 502, the numerical values of the upper left coordinates corresponding to the imaging direction when the "upper left" button 505 is pressed.

Next, the user moves the imaging direction to the lower right of the range, a panoramic image of which is to be created, and presses a "lower right" button 506. This operation inputs, to the text boxes 503 and 504, the numerical values of the lower right coordinates corresponding to the imaging direction when the "lower right" button 506 is pressed. In this method, the user can determine the creation range of a panoramic image while observing an actual video. Note that the user may designate the lower right, and then designate the upper left. A GUI for designating "upper right" and "lower left" may be used, as a matter of course.

A control unit 302 calculates a creation period and image capturing count necessary to create a panoramic image of the range corresponding to the range box 404 by the same method as in the first embodiment, and displays them in text boxes 407 and 409. This allows the user to grasp the period and image capturing count necessary to create a panoramic image of the designated range. Panoramic image creation processing is the same as in the first embodiment and a detailed description thereof will be omitted.

As described above, by using the GUI according to the second embodiment, the user can recognize a period necessary to create a panoramic image in a desired range, a panoramic image of which is to be created. It is possible to instruct creation of a panoramic image in accordance with a status or application purpose. For example, if the period is limited, the designated range is narrowed, and if an enough period is set, the designated range is widened.

Third Embodiment

A display control apparatus, image processing apparatus, display control method, and image processing method in a network camera system according to the third embodiment of the present invention will be described below. Note that in the third embodiment, the same reference numerals as those in the first and second embodiments denote the same components and a detailed description thereof may be omitted.

Figure 8:
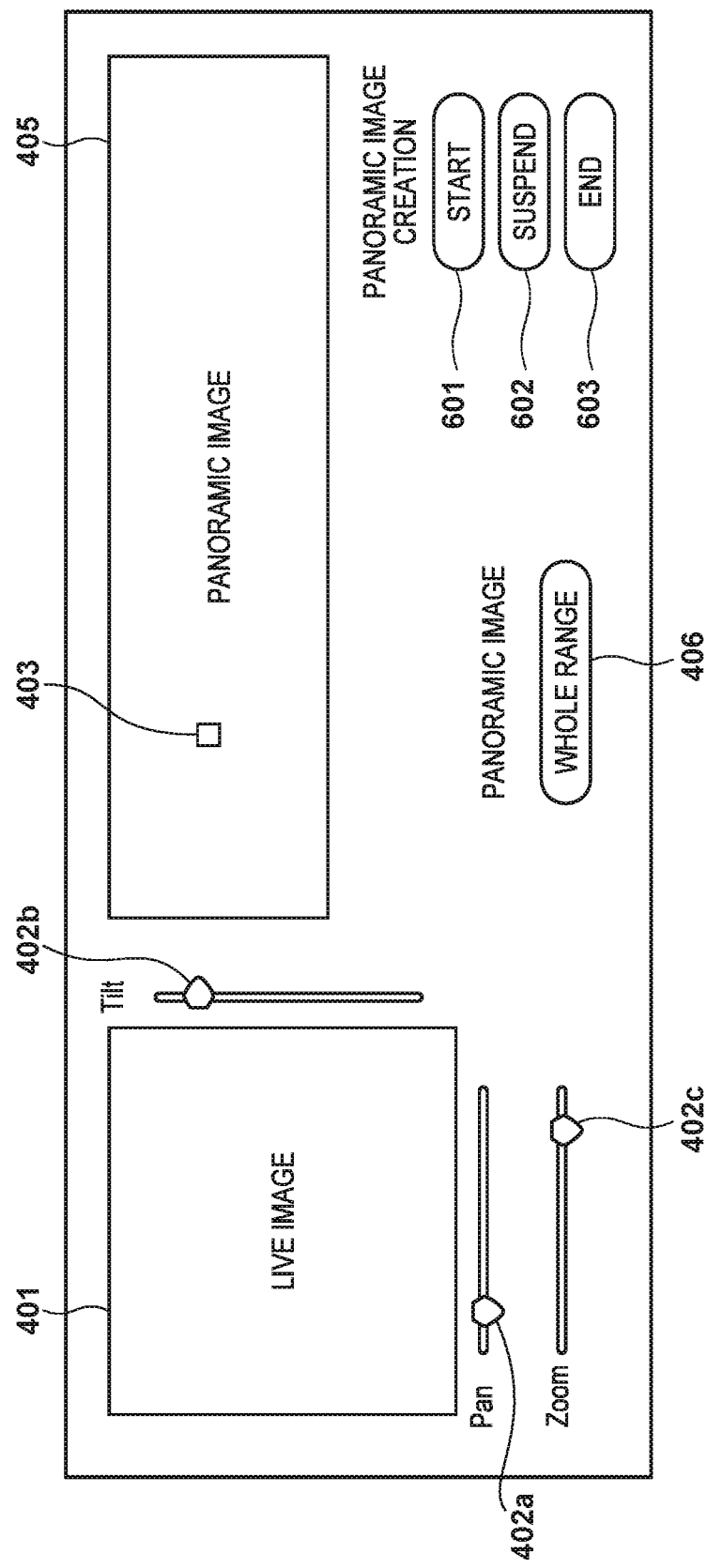
FIG. 8 is a view showing an example of a GUI generated by a display control unit or the like according to the third embodiment.

The third embodiment will describe an example of creating a panoramic image using images captured during a period from when panoramic image creation processing starts until it is suspended without determining the range of the panoramic image. FIG. 8 shows an example of a GUI generated by a display control unit 305 or the like according to the third embodiment. By using the GUI shown in FIG. 8, the user can instruct to start and suspend panoramic image creation processing.

The user sets an imaging direction to a direction (to be referred to as a "start position" hereinafter) when processing of capturing images to be used to create a panoramic image starts by operating sliders 402a, 402b, and 402c. Assume that the user especially sets the start position in a range of interest within the movable range of a camera 101. Note that the start position may be instructed by using text boxes 501 to 504 shown in FIG. 7 or by moving a guide box 403.

After the start position is set, the user presses a "start" button 601 to instruct creation of a panoramic image. Upon pressing of the "start" button 601, a control unit 302 (or control unit 208) starts creation of a panoramic image by the method described in the first embodiment, and creates a panoramic image by moving the imaging direction from the start position in a spiral pattern. Therefore, the range of the panoramic image gradually spreads by centering the range of interest by the user. Note that the order of the imaging directions is not limited to the spiral pattern, and any order may be adopted as long as an imaging direction close to the start position is preferentially captured.

Figure 9A:
FIGS. 9A to 9C are views each showing a display example of a panoramic image display portion for indicating a panoramic image creation range.
Figure 9B:
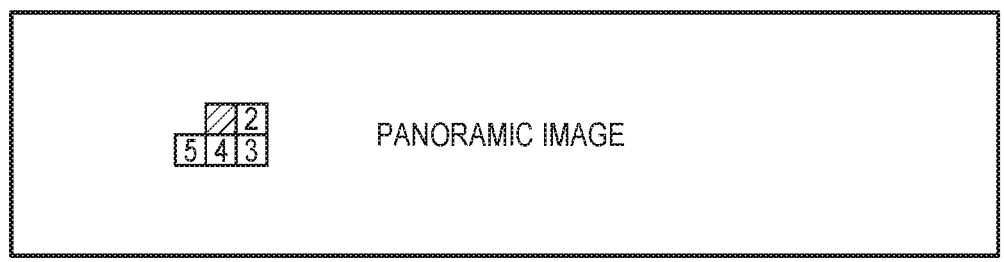
Figure 9C:

FIGS. 9A to 9C each show a display example of a panoramic image display portion 405 for indicating the creation range of a panoramic image. In other words, FIGS. 9A to 9C show a case in which the creation range of a panoramic image spreads by moving the imaging direction in a spiral pattern. FIG. 9A shows a state in which a start position 701 is designated. FIG. 9B shows a display example of the panoramic image display portion 405 when the imaging direction is moved from the start position 701 in a spiral pattern and the fifth image is captured. Similarly, FIG. 9C shows a display example of the panoramic image display portion 405 when the imaging direction is moved in the spiral pattern and the eighth image is captured. After that, as indicated by a broken line in FIG. 9C, the image directions in each of which an image capturing operation has ended are sequentially displayed. The user can readily grasp a range, a panoramic image of which has been created, by referring to the display of the panoramic image display portion 405.

As described above, an image capturing device is controlled to change its imaging direction, thereby capturing a plurality of captured images in different imaging directions. When a predetermined instruction is input, a panoramic image is generated using images captured before the instruction is input.

Figure 10:
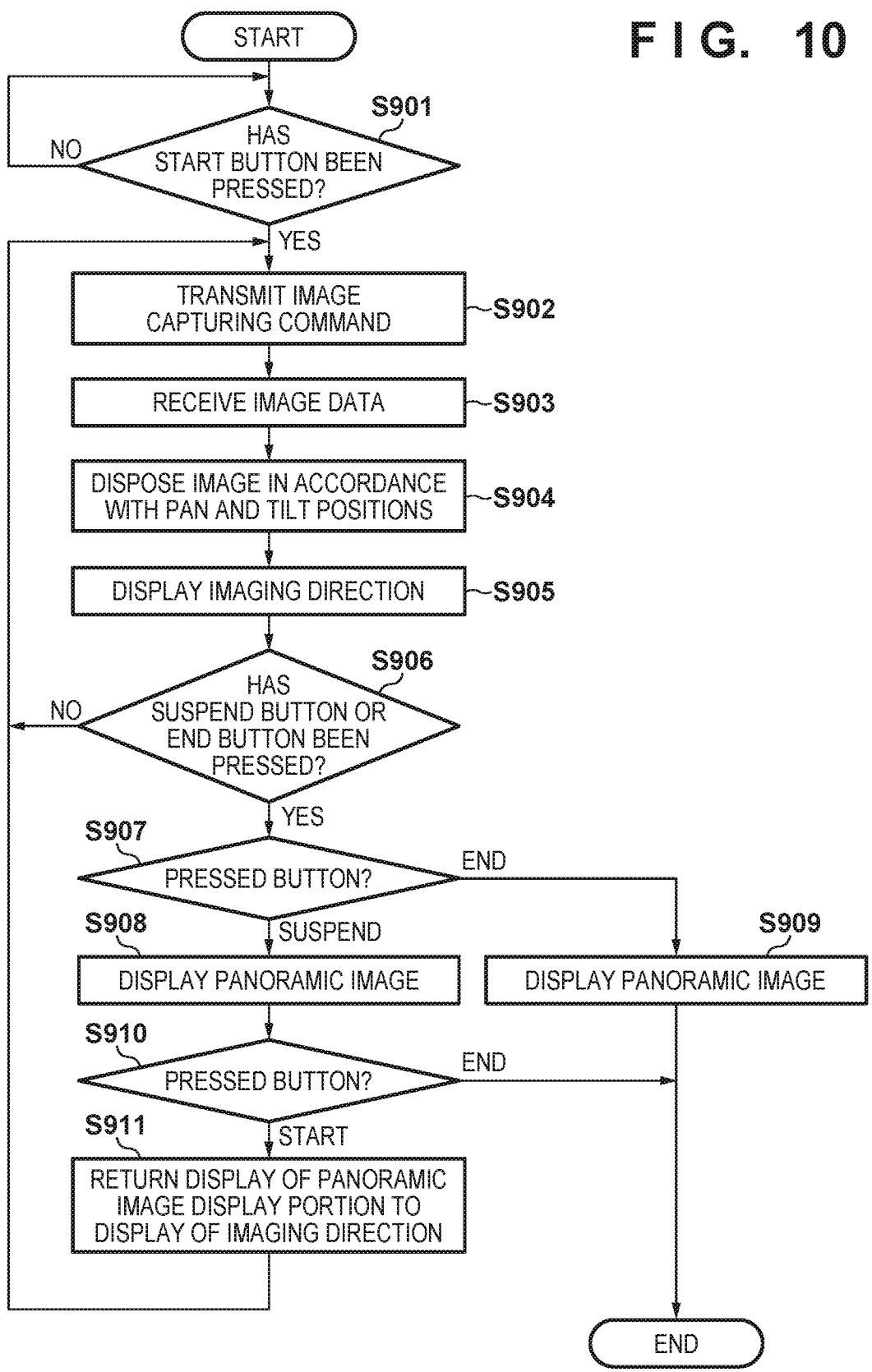
FIG. 10 is a flowchart for explaining panoramic image generation processing according to the third embodiment.

FIG. 10 is a flowchart for explaining panoramic image generation processing according to the third embodiment. Note that the processing of the camera 101 is the same as in FIGS. 5A and 5B, and is not shown in FIG. 10. Although issuance of a return command is not shown in FIG. 10, the imaging direction may or may not be returned. Furthermore, FIG. 10 shows an example in which a client device 102 generates a panoramic image. However, a modification in which the camera 101 generates a panoramic image can readily occur to those skilled in the art by referring to FIG. 6.

The control unit 302 determines whether the "start" button 601 has been pressed (S901). If the "start" button 601 has been pressed, the control unit 302 generates an image capturing command to instruct to obtain a captured image corresponding to the start position 701, and transmits the image capturing command to the camera 101 (S902).

A communication unit 301 receives image data captured by the camera 101, and an image decompression unit 304 decompresses the received image data and inputs it to a panoramic image generation unit 307 (S903). The panoramic image generation unit 307 disposes the input image in accordance with pan and tilt positions input from the control unit 302 (S904). The display control unit 305 displays the imaging direction on the panoramic image display portion 405 based on the pan and tilt positions input from the control unit 302 (S905).

During creation of a panoramic image, the user can press a "suspend" button 602 or an "end" button 603 at any time. The control unit 302 determines whether the "suspend" button 602 or the "end" button 603 has been pressed (S906). If none of the buttons has been pressed, the process returns to step S902 to repeat the operation of obtaining a captured image by changing the imaging direction in the spiral pattern.

If the "suspend" button 602 or the "end" button 603 has been pressed, the control unit 302 determines the pressed button (S907). If the "suspend" button 602 has been pressed, the control unit 302 suspends the image capturing operation, and controls the display control unit 305 to display, on the panoramic image display portion 405, a panoramic image obtained by joining images captured before the suspend instruction is issued (S908). If the "end" button 603 has been pressed, the control unit 302 displays the generated panoramic image (S909), and ends the panoramic image creation processing.

After pressing the "suspend" button 602, the user refers to the panoramic image displayed on the panoramic image display portion 405 to determine whether the panoramic image covers a range of interest. If it is determined that the created panoramic image does not cover the range of interest, the user instructs to resume the panoramic image creation processing by pressing the "start" button 601 again.

After suspending the panoramic image creation processing, the control unit 302 determines whether the "start" button 601 or the "end" button 603 has been pressed (S910).

If the "start" button has been pressed, the control unit 302 controls the display control unit 305 to return the display of the panoramic image display portion 405 to the display of the imaging direction shown in FIG. 9A, 9B, or 9C (S911). The process returns to step S902 to resume the panoramic image creation processing. As a result, the captured image obtaining processing of changing the imaging direction in the spiral pattern from the imaging direction when the panoramic image creation processing is suspended is resumed.

If the panoramic image covering the range of interest is obtained, the user presses the "end" button 603 to instruct to end the panoramic image creation processing. Therefore, if it is determined in step S910 that the "end" button 603 has been pressed, the control unit 302 ends the panoramic image creation processing.

In addition, an operation of suspending or ending the panoramic image creation processing is not limited to the operation of the "suspend" button 602 or "end" button 603. For example, a method may be adopted in which a creation period input to a text box 407 shown in FIG. 4 is set as a time limit, and when the time limit expires, the panoramic image creation processing is suspended or ended. Note that if no time limit is designated and no instruction to suspend or end the panoramic image creation processing is issued, the control unit 302 (or control unit 208) generates a whole range image as a panoramic image.

As described above, by using the GUI according to the third embodiment, the user can create a panoramic image covering a range of interest by the user within the image capturing capable range of the camera 101. At this time, the user can suspend the panoramic image creation processing by observing a change in imaging direction (enlargement of the range of the panoramic image), and determine whether the panoramic image created until now covers the range of interest. If the panoramic image covers the range of interest, the user can end the panoramic image creation processing; otherwise, the user can resume the panoramic image creation processing.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), ora micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)®), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-058293 filed Mar. 20, 2015, which is hereby incorporated by reference herein in its entirety.

What is claimed is:

1. A display control apparatus for assisting capturing by an image capturing device that is capable of pan/tilt/zoom operation, the apparatus comprising:
  circuitry configured:
    to obtain a time period input by a user, wherein the time period is a time period to generate a panoramic image, which is to be generated by a plurality of captured images;
    to display, on a user interface of a display unit, a first range indicating a whole range that can be captured by the image capturing device by the pan/tilt/zoom operation, and a second range indicating a range of a panoramic image that can be generated in a time period input by a user, wherein the second range is a portion of the first range; and
    to generate the panoramic image corresponding to the second range displayed on the user interface.

2. The apparatus according to claim 1, wherein the circuitry is further configured to display, on the user interface of the display unit, a given panoramic image corresponding to the first range.

3. The apparatus according to claim 1, wherein, when the time period is obtained, the circuitry is further configured to display, on the user interface of the display unit, the second range centered on a third range, which is a current capturing range of the image capturing device, in accordance with the time period.

4. The apparatus according to claim 1, wherein the circuitry is further configured to calculate the second range in accordance with the time period and an angle of view of the image capturing device.

5. The apparatus according to claim 1, wherein a change of the imaging direction of the image capturing device is started from a first imaging direction, and a captured range by the image capturing device spreads around the first imaging direction.

6. The apparatus according to claim 5, wherein the change of the imaging direction of the image capturing device ends if the captured range becomes equal to the second range.

7. A display control method for assisting capturing by an image capturing device that is capable of pan/tilt/zoom operation, the method comprising:
  using a processor to perform:
    obtaining a time period input by a user, wherein the time period is a time period to generate a panoramic image, which is to be generated by a plurality of captured images;
    displaying, on a user interface of a display unit, a first range indicating a whole range that can be captured by the image capturing device by the pan/tilt/zoom operation, and a second range indicating a range of a panoramic image that can be generated in the time period input by the user, wherein the second range is a portion of the first range; and
    generating the panoramic image corresponding to the second range displayed on the user interface.

8. The method according to claim 7, further comprising displaying, on the user interface of the display unit, a given panoramic image corresponding to the first range.

9. The method according to claim 7, further comprising, when the time period is obtained, displaying, on the user interface of the display unit, the second range centered on a third range, which is a current capturing range of the image capturing device, in accordance with the time period.

10. The method according to claim 7, further comprising calculating the second range in accordance with the time period and an angle of view of the image capturing device.

11. The method according to claim 7, wherein a change of the imaging direction of the image capturing device is started from a first imaging direction, and a captured range by the image capturing device spreads around the first imaging direction.

12. The method according to claim 11, wherein the change of the imaging direction of the image capturing device ends if the captured range becomes equal to the second range.

* * * * *